United States Patent [19]

Laufer

[11] 4,135,216
[45] Jan. 16, 1979

[54] SWITCHING ARRANGEMENT FOR A TAPE RECORDER

[75] Inventor: Helmut Laufer, St. Georgen, Fed. Rep. of Germany

[73] Assignee: Dual Gebrüder Steidinger, St. Georgen, Fed. Rep. of Germany

[21] Appl. No.: 860,765

[22] Filed: Dec. 15, 1977

[51] Int. Cl.² .......................... G11B 15/48; G09F 9/00
[52] U.S. Cl. ...................................... 360/74; 116/299; 360/137
[58] Field of Search ................. 360/137, 74; 242/191; 116/129 A, 114 J, 135; 235/144 MC

[56] References Cited

U.S. PATENT DOCUMENTS

| 3,687,397 | 8/1972 | Suzuki et al. | 242/191 |
| 4,044,233 | 8/1977 | Sato | 242/191 |

Primary Examiner—Robert S. Tupper
Attorney, Agent, or Firm—Max Fogiel

[57] ABSTRACT

A tape recorder in which a counter indicates the tape length traversed in the recorder. The counter may be returned to an initial position by a manually operated element. A switching unit for shutting off the drive for the tape, is coupled to the counter so that the drive for the tape is shut off when the counter has returned to its initial position. The counter, furthermore, may be set to a pre-initial position ahead of the first-mentioned initial position by an amount of tape length which corresponds at least to the length of a dead portion of the tape, on which no recording or playback is possible. The recorder is also provided for resetting the speed of the tape from normal speed for recording or playback, to fast speed in the forward and rewind directions. The shutting off of the drive may be operated so that it becomes ready to function only when the fast forward setting is made. The counter may have numbered dials mounted on a common axis and bearing the indicated numbers on their circumference.

3 Claims, 5 Drawing Figures

SWITCHING ARRANGEMENT FOR A TAPE RECORDER

BACKGROUND OF THE INVENTION

The present invention relates to a switching arrangement for an audio or magnetic tape recorder which is used to return the tape after a recording, unless it begins with the start of the tape, to its initial position at the beginning of the recording without having to remember the position of the counter where the recording was begun. A requirement is that the counter at the start of the recording be placed in its initial position which is achieved by striking a key. Such a disconnect arrangement which, in the initial position shuts off the counter, is not always in operation. Instead, it is operative only when the quick rewind of the tape is started.

Audio or magnetic tapes usually have a dead section, i.e. the beginning and end of the tape are formed by a section of tape which does not permit recording or playback. Therefore, at the start of a recording at the beginning of a tape, the tape must first be advanced by at least a portion of the dead section. This requires the following operations: First, the tape must be advanced, observing the counter or the tape itself, by a certain portion, and then the tape advance must be shut off. Thereafter the counter must be placed in the zero position.

In order to simplify this operation and to shorten the process, there is known a switching arrangement which shuts off the device automatically after running through the dead section, so that observation of the counter or of the tape and the manual shutoff can be dispensed with, but not the setting of the counter to zero. The time of shutoff is determined electronically. Such a device is relatively expensive and has the disadvantage that the time of shutoff with respect to tape length is subject to relatively large tolerances whose causes stem from the electrical time determining means, since the expense involved must not be too high, but also that the accelerations differ when the tape starts up. The result is that with this invention it is not possible to precisely relocate the start of an already recorded audio program automatically in the same manner. This is of importance when the playback or replay of a recording is to start at a fixed instant, i.e., that the pressing of the replay key coincides precisely with the start of replay, as is desired, for example, when fading in a recording.

It is, therefore, an object of the present invention to simplify the above switching arrangement and its handling, and to make it available for replay with precisely determinable starting times.

Another object of the present invention is to provide an arrangement of the foregoing character which may be economically fabricated and which has a substantially long operating life.

A further object of the present invention is to provide an arrangement, as described, which may be readily maintained in service.

SUMMARY OF THE INVENTION

The objects of the present invention are achieved by using a shut-off device already present with recorders of the type involved here, and which in the zero position of the counter shuts off the device in connection with a certain pre-initial position of the counter (set by simply pressing a key). It is thereby possible to establish a precisely determinable tape length for recording or replay. As a result, during replay with this arrangement the start can be located precisely without having to set the counter to zero after running through the dead section before starting the recording. The simplification of the switching arrangement results from merely expanding by a few more parts, the counter which comprises inexpensive plastic parts.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
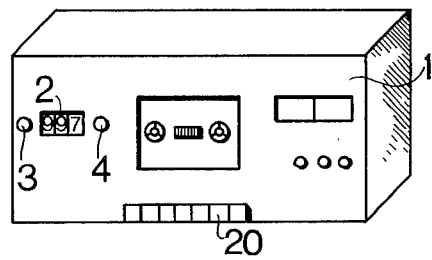
FIG. 1 shows a top view of a cassette recorder.
Figure 3:
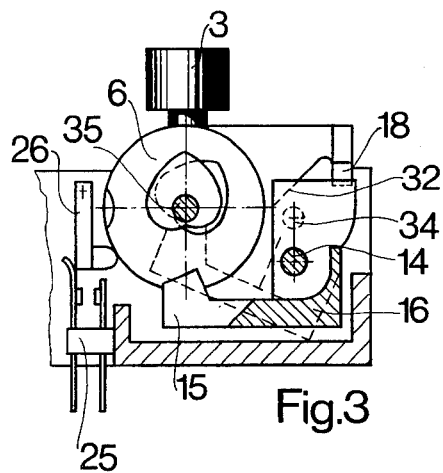
FIG. 3 shows a section taken along line III—III in FIG. 2.
Figure 4:
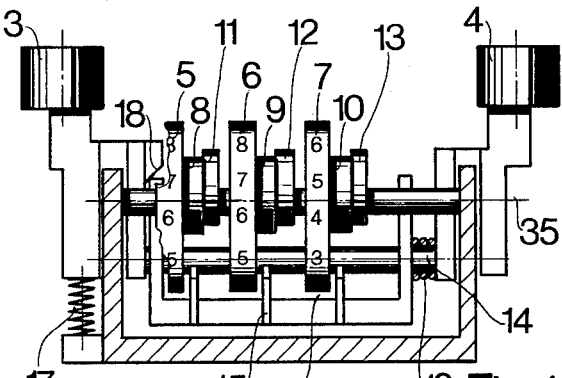
FIG. 4 shows a side view of FIG. 2.
Figure 2:
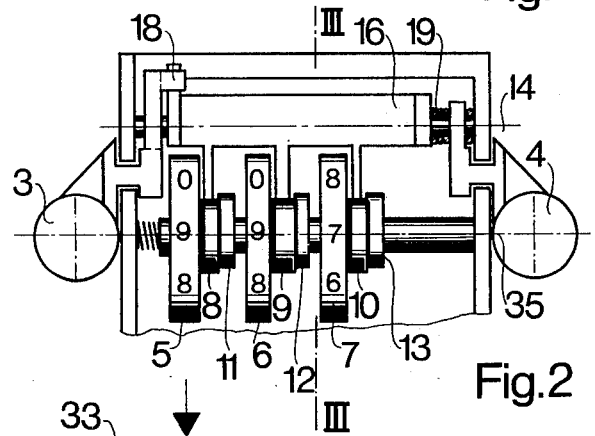
FIG. 2 shows the top view of a counter for the cassette recorder.
Figure 5:
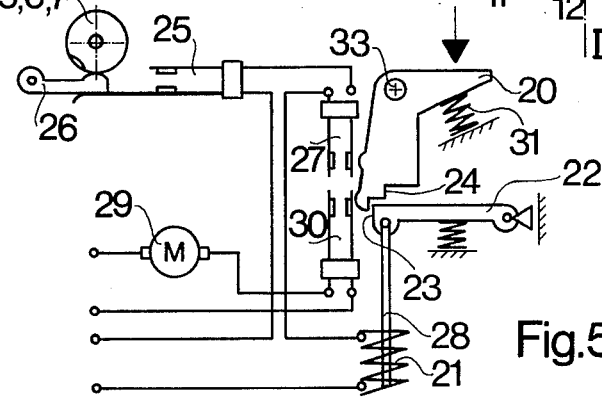
FIG. 5 shows circuit details for controlling the tape drive in accordance with the present invention.

In the front plate 1 of the cassette tape recorder, the counter 2 is installed with two control elements 3, 4 being keys. The counter 2 contains three numbered dials 5, 6, 7 each of which is connected to a first curved disk 8, 9, 10 and a second curved disk 11, 12, 13.

Around an axis 14 parallel to the number dial axis 35, there are three feeler levers 15 which are fastened to a common carrier part 16, that are tiltably mounted. The feeler levers 15 are in one plane with the first curve disks 8, 9, 10 and can be pressed by actuating the zero-position key 4 against the curved disks 8, 9, 10 in a manner not further described, bringing the number dials 5, 6, 7 to their zero-position. On counter 2 there is a contact pair 25 which is controllable via a lever 26 controlled by three numbered dials 5, 6, 7 and is closed in a known manner (not shown) only when all three number dials 5, 6, 7 are on zero. An insertion key 3 can be shifted against a spring 17 and contains an inclined plane 18 which contacts the carrier part 16 of feeler lever 15 in such a way that the carrier part 16 during pressing of the insertion key 3 is shifted on its rotation axis 14 against the action of a spring 19 that the feeler levers 15 come to lie in the plane of the second curve disks 11, 12, 13. With further depression of insertion key 3, it presses with surface 32 against a projection 34 of carrier part 16 of feeler levers 15 so that it tilts about its rotary axis 14 and thus the feeler levers 15 are pressed against the second curved disks 11, 12, 13. The curved disks 11, 12, 13 have such a position relative to number dials 5, 6, 7 that the counter 2 is set to "997".

An operating element 20 forming a key, which is used for setting to fast forward, is tiltably mounted in an axis 33 and is tiltable against the action of a spring 31 by a predetermined amount. It is also detentable in the tilted position by means of a locking pawl 22 which, with its face side 23, drops behind a detent 24 of the operating element 20. The contact pair 25 attached on the counter 2 is controlled, as described, by counter 2 via a lever 26. The contacts close as soon as all three number dials 5, 6, 7 are in zero-position. This and another contact pair 27 which is controlled by the operating element 20, are in the circuit of a lifting magnet 21 whose armature 28 is connected to the locking pawl 22 for the operating element 20. In the circuit for the driving means 29 of the tape, is a contact pair 30 which is also controlled by operating element 20.

If an unrecorded cassette is to be recorded, after insertion of a (completely rewound) cassette into the recorder, the insertion key 3 of the counter 2 is depressed, with the counter 2 indicating "997".

Operating element 20 for setting the fast forward is pressed to its locked position, closing the contact pair 30 for the circuit of the driving means 29.

As soon as the tape moves, the counter 2 starts to turn. By actuating operating element 20 for fast forward, contact pair 27 for the lifting magnet 21 becomes closed. But no current can flow yet since the contact pair 25 on the counter is still open. Only when the counter 2 has reached the zero position, the contact pair 25 closes and with it the circuit for the lifting magnet 21 which, by means of its armature coupled to the locking pawl 22, unlocks the operating element 20, so that it returns to its initial position under the action of its spring 31 and thus opens the contact pair 30 for the driving means 29. Movement of the tape is thereby stopped. The tape transport may, of course, also be mechanical or auxiliary mechanical. For the sake of simplicity, only electrical shut-off is illustrated here.

The arrangement is made so that the shut-off coupled with the counter becomes effective only when setting for fast forward; this is a safety measure to avoid an interruption during ordinary forward operation, i.e., when recording or replaying, and when the counter attains the zero-position because it had not been set to zero at the start. The position "997" of the counter is chosen so that upon reaching the zero-position, the dead section of the tape has completely passed the magnetic head. In this position, the recorder is ready for recording with properly set counter without any further manipulations.

During replay of a recording, one may proceed in the same manner. The tape is then precisely at the start of the recorded recording so that the start of reproduction can be determined at the precise time by pressing the replay key.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A tape recorder comprising: driving means for moving a tape, said tape having a beginning dead portion on which no recording or playback is possible; counter means for indicating the tape length moved past a predetermined location in the recorder; manually operated first means for returning said counter means to an initial position; switching means for shutting off said driving means for the tape and connected to said counter means so that said driving means for the tape is shut off when said counter means has returned to said initial position; and second means including an operating element for setting said counter means into a pre-initial position ahead of said initial position by an amount of tape length corresponding at least to the length of said dead portion of said tape; said driving means being shut off when said counter means reaches again said initial position after having been at said pre-initial position, said tape being driven through said dead portion to said initial position before recording or playback.

2. A tape recorder as defined in claim 1 including means for setting speed of the tape from normal speed for recording or playback to a fast speed in forward and rewind directions; means for actuating and deactuating said switching means controlled by said counter means; said means for actuating and deactuating said switching means being coupled with said means for setting fast forward speed so that said switching means for shutting off said driving means being operative only after a fast forward speed setting has been made.

3. A tape recorder comprising: driving means for moving a tape, said tape having a beginning dead portion on which no recording or playback is possible; counter means for indicating the tape length moved past a predetermined location in the recorder; manually operated means for returning said counter means to an initial position; switching means for shutting off said driving means for the tape and connected to said counter means so that said driving means for the tape is shut off when said counter means has returned to said initial position; and means including an operating element for setting said counter means into a pre-initial position ahead of said initial position by an amount of tape length corresponding at least to the length of said dead portion of said tape; said counter means having numbered dials mounted on a common axis and bearing indicated numbers on their circumferences; a first curved disk and a second curved disk coaxially adjacent with each numbered dial and rigidly connected thereto; a plurality of sensing levers corresponding in number to the number of dials; common carrier means fastened to said levers and carrying said levers; said common carrier means being pivotable on an axis parallel to said axis of said numbered dials; spring means; said carrier means being rotatably and axially displaceable against the action of said spring means; a first operating element for tilting said carrier means to contact the first curved disks, said sensing levers and first curved disks cooperating so that all numbered dials are turned to a zero-position by engagement of said levers and said first curved disks; a second operating element for tilting said carrier means; means for axially shifting said carrier means and connected to said second operating element for becoming operative upon actuation of said second operating element before said second operating element tilts said carrier means axially against the action of said spring means to an extent that said sensing levers are moved into regions of said second curved disks, said second curved disks being connected to said numbered dials so that said numbered dials are set to said pre-initial position under contact pressure of said sensing levers.

* * * * *